J. A. DODGE.
Mower.
No. 47,807.
2 Sheets—Sheet 1.
Patented May 23, 1865.
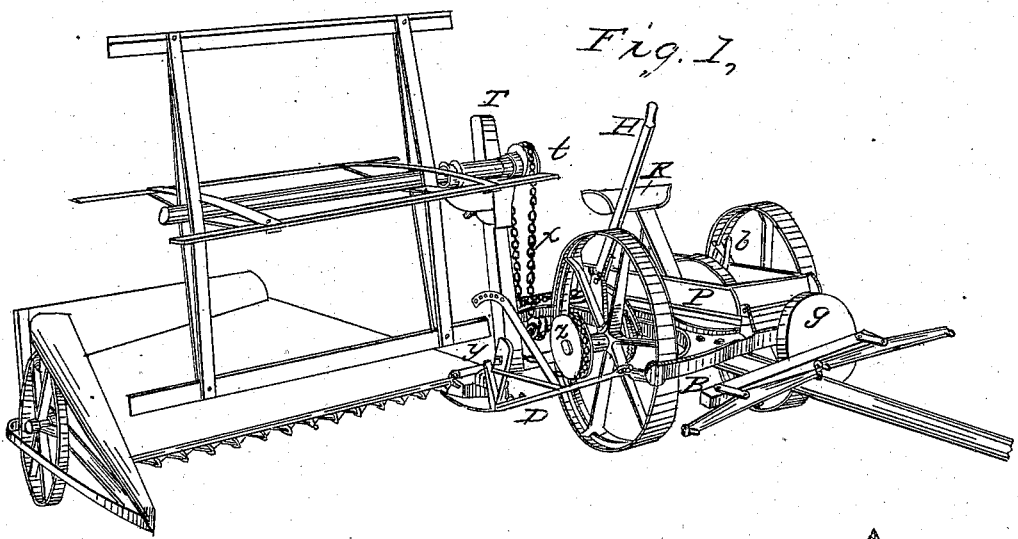
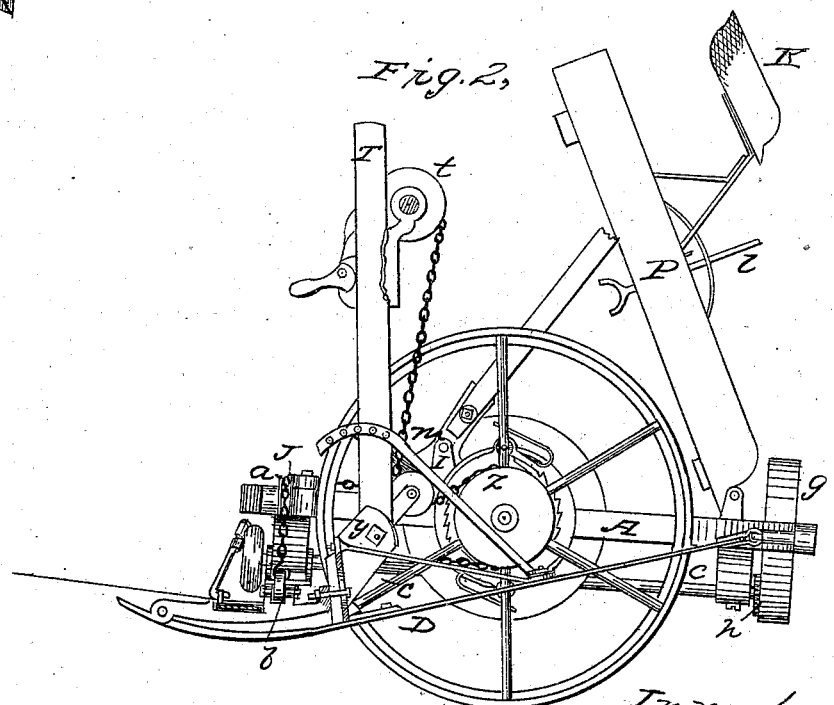

J. A. DODGE.
Mower.
No. 47,807.
2 Sheets—Sheet 2.
Patented May 23, 1865.
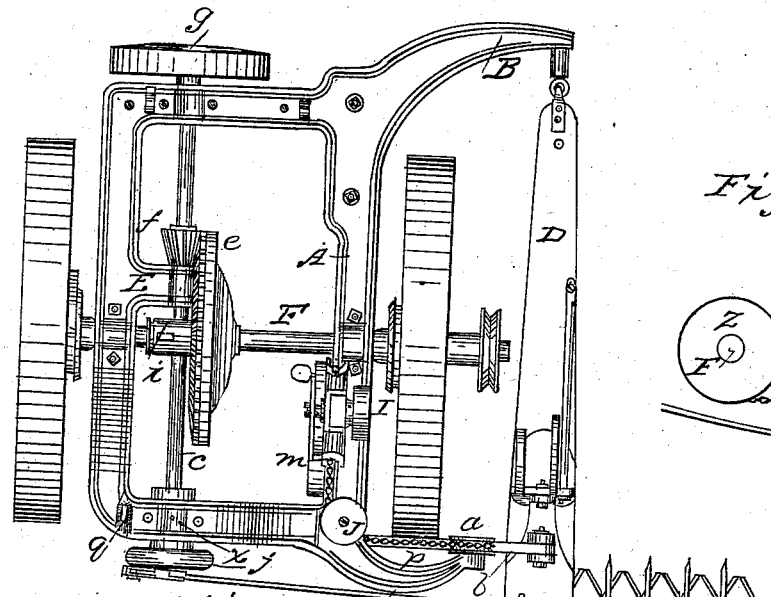
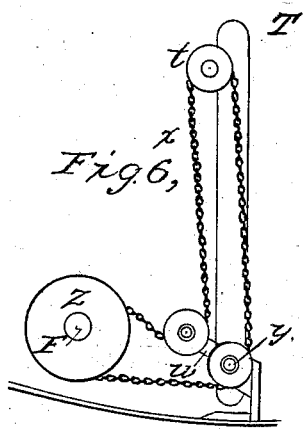
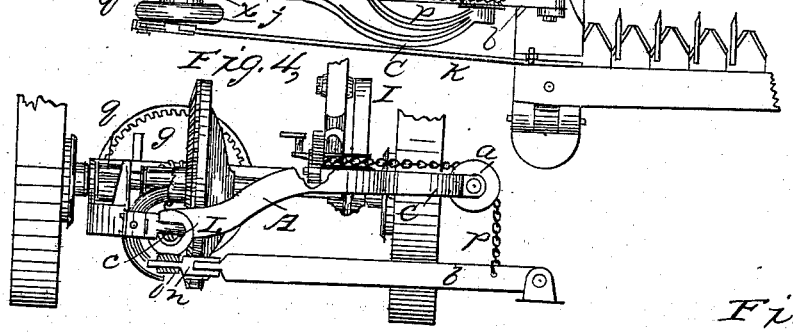
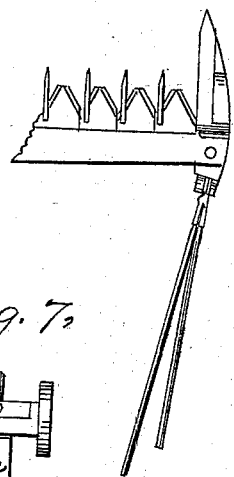
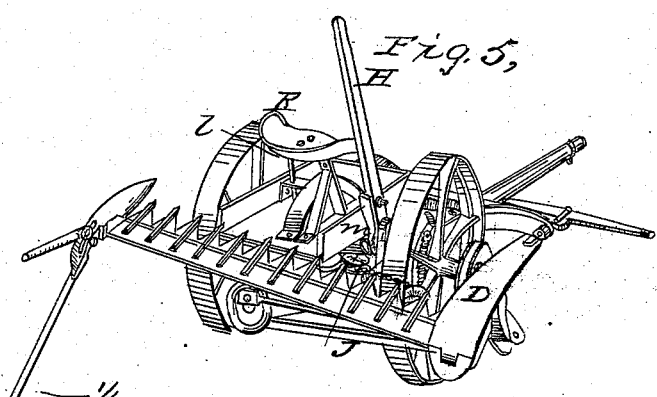
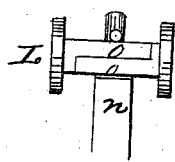
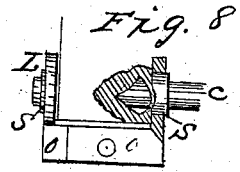
Witnesses:
Inventor
John A. Dodge
By his Atty's
Knight & Dodge

UNITED STATES PATENT OFFICE.

JOHN A. DODGE, OF AUBURN, NEW YORK.

IMPROVEMENT IN HARVESTERS.

Specification forming part of Letters Patent No. 47,807, dated May 23, 1865.

*To all whom it may concern:*

Be it known that I, JOHN A. DODGE, of Auburn, in the county of Cayuga and State of New York, have invented certain new and useful Improvements in Mowing and Reaping Machines; and I do hereby declare the following to be a full, clear, and exact description thereof, reference being had to the accompanying drawings, making part of this specification, and to the letters of reference marked thereon, in which—

Figure 1 is a perspective view of my improved machine when used as a reaper. Fig. 2 is a side elevation of the machine with the platform and reel detached; Fig. 3, a top view of the machine when used as a mower; Fig. 4, a rear view with the cutter detached; Fig. 5, a perspective view of the same, showing the cutting apparatus folded over upon the frame; and Fig. 6 is side view of the self-adjusting pulley in position for operation. Figs. 7 and 8 are views of detached portions shown in detail.

The nature of my invention consists in a novel manner of constructing the main frame of the machine, and of the arrangement of the gearing in connection therewith.

It further consists in a novel arrangement of the devices for lifting the cutting apparatus, and also in a self-adjusting pair of pulleys, to be used in connection with the reel.

To enable others skilled in the art to construct and use my invention, I will proceed to describe it.

A represents the main frame of my improved machine. (More clearly shown in Fig. 3.) This frame I construct of cast-iron and all in a single piece, for the purpose of making it strong, durable, and cheap, and at the same time to afford firm and reliable bearings for the operating mechanism. The body of the frame I make only about half as long again as it is wide, so as to render the machine as compact as possible, and on the inner side, at both front and rear, there is cast, in connection with the frame, arms B and C, to afford proper attachments for the cutting apparatus. In order to permit the use of a long drag-bar, D, the front arm, B, is so curved as to throw its outer end, to which the drag-bar D is attached, some distance in advance of the body of the frame, as clearly shown in Fig. 3. The rear arm, C, is also curved, as shown in the drawings, for the purpose of allowing room for the wheel of the machine in that side, and to bring its extremity in the position required to form a bearing for the pulley $a$ in a line directly over the hinged brace-bar $b$. The rear left-hand portion of the frame is dropped or curved downward, as shown in Fig. 4, for the purpose of furnishing a solid bearing for the crank-shaft $c$, and dispense with the "hanger" usually applied in such cases. On the inner left-hand side of the frame a short arm, E, is located, as shown, for the purpose of forming a bearing for the rear end of shaft $d$, said arm being cast solid with the frame.

The wheels are connected to the axle F by means of ratchets and pawls, in the usual manner, so as to permit the machine to be backed and turned without interfering with the operation of the mechanism. A beveled gear-wheel, $e$, is mounted loosely on the axle F, as shown, which wheel gears into wheel $f$ on shaft $d$, the front end of which shaft projects beyond the frame, and has secured thereon the internally-geared wheel $g$. Directly underneath shaft $d$, and in line therewith, is placed the crank-shaft $c$, which extends the whole length of the main frame. A pinion, $h$, (shown in Fig. 2,) is secured to the front end of shaft $c$, and gears into the wheel $g$, a small balance-wheel, $j$, being secured to the rear end of said shaft, the sickle G being connected thereto and operated by means of the connecting-rod $k$, in the usual manner. A sliding clutch, $i$, operated by the lever $l$, serves to connect the wheel $e$ rigidly to the shaft F when it is desired to operate the mechanism. The object of this arrangement of the operating mechanism is to secure strong and unyielding bearings for the various parts, and especially to secure a long crank-shaft, whereby it is less liable to get out of line or to become injured and worn.

Upon the right-hand portion of the frame, and a short distance in rear of the axle, is located a vertical standard, I, which is cast solid with the frame A, and, like arm E, forms a part thereof. To this standard is pivoted the lifting-lever H, to the bottom of which is secured a grooved segment, $m$, of the usual form. At the rear right-hand corner of the main frame is placed a pulley, J, working on a vertical axis, the pulley being above the frame, as shown in the drawings. On the front face, and at the outer end of arm C, is located, in a vertical plane, a similar pulley, $a$.

To the front of the segment $m$ is attached one end of a chain, $p$, which, after passing around and underneath said segment, extends from thence back around pulley J, from whence it passes out to and over pulley $a$, down to the brace-bar $b$, to which its end is securely attached. By this arrangement of the lifting devices I am enabled to locate the lever H midway of the frame A and on the inside of the wheel, so as to bring it within reach of the driver upon the seat K, which is placed slightly in rear of the axle of the machine, whereby he has the cutting apparatus at all times completely under his control. The fulcrum $a$ is brought well out over the drag-bar D, while the lifting device is placed well forward on the frame, which permits the cutting apparatus to be folded over flat on the rear portion of the frame, or of the platform mounted thereon.

The brace-bar $b$ is secured at its left-hand end to a stirrup, L, composed of the two pieces $o\ o$, as more clearly shown in Figs. 7 and 8. In Fig. 7 the stirrup is shown detached from its bearings, with the parts $o\ o$ united by the journal of $n$, which extends through a hole in the under portion of the pieces $o\ o$. The stirrup L is mounted on the box or bearing of shaft $c$ at the rear portion of the frame A, the upper half of which box is cast solid with the frame, and both parts of said box being made to project a short distance beyond the sides of the cross-piece of the frame, which projections, being turned off round and smooth, form journals for the stirrup L. By this means a strong and firm attachment is secured for the brace-bar $b$, which is thus pivoted concentrically with the crank-shaft $c$, as shown in Figs. 2, 4, and 8, in the latter of which the projecting bearings of L are indicated by $s$.

T represents a reel-post secured to the drag-bar in the usual manner. To this post the reel is attached by means of a movable clamp, and is driven by the chain $x$, which receives its motion from pulley $z$ on the end of axle F of the machine, as clearly shown in Figs. 1, 2, and 6. In order to compensate for the oscillations of the pulley $t$ on the end of the reel-shaft, which oscillations will be produced by the irregularities of the ground over which the drag-bar D passes, and for the purpose of keeping the chain $x$ at all times taut on the pulleys $z$ and $t$, a pair of pulleys are mounted in a frame, $w$, which frame is pivoted to the foot of the reel-post T on the bolt $y$, which secures said post to the drag-bar, said bolt also forming the axis of the lower pulley. The pulleys in frame $w$ are thus rendered self-adjusting, and readily adapt themselves to any movement of the reel-post and consequent change in the position of the chain $x$, whereby the latter is kept at a uniform tension, and any liability to a stoppage of the rotation of the reel is thereby entirely obviated.

At the rear left-hand corner of the frame is located a short standard, $q$, as shown in Figs. 1 and 2. This standard, like that at I, is cast solid with the main frame, and is of such a length as to bring its upper end even with the upper surface of the main frame A where the latter is not depressed. The object of this standard is to provide a support for the rear left-hand corner of the platform P, its right-hand corner resting on the frame just to the right of where it is curved downward to form the bearing for the shaft $c$.

Having thus described my invention, what I claim as new, and desire to secure by Letters Patent, is—

1. The main frame A when cast in one single piece, in the form and manner described.

2. In combination with the main frame A, as described, the arms B and C, projecting from the front and rear inner corners, for the purpose described and set forth.

3. In combination with the frame A, the combination and arrangement of the geared wheels $e$ and $f$, the geared wheels $g$ and $h$, and the shafts $c$ and $d$, when the shaft $c$ is placed beneath the shaft $d$ for the purpose of placing the pitman-wrist as nearly in line with the cutter-bar as possible.

4. In combination with the arm C and the pulleys J and $a$, the lever H, situated and operating as described.

5. In combination with the main frame of a harvesting-machine and the lifting-bar $b$, the stirrup L, as described and set forth.

6. The self-adjusting pulleys pivoted at the foot of the reel-post, substantially as and for the purpose set forth.

JOHN A. DODGE.

Witnesses:
JAMES L. DINN,
HORACE T. COOK.